United States Patent [19]

Kitazawa et al.

[11] Patent Number: 5,350,550
[45] Date of Patent: Sep. 27, 1994

[54] METHOD OF PRODUCTION OF A PLASTIC LAMINATE

[75] Inventors: Kouitu Kitazawa; Eitaro Nakamura, both of Kawasaki, Japan

[73] Assignee: Nippon Zeon Co., Ltd., Tokyo, Japan

[21] Appl. No.: 94,729

[22] Filed: Jul. 21, 1993

[30] Foreign Application Priority Data

Jul. 22, 1992 [JP] Japan .................................. 4-216537

[51] Int. Cl.$^5$ .............................................. B29D 9/00
[52] U.S. Cl. ...................................... 264/45.1; 264/54; 427/195; 427/386; 427/393.5; 427/400
[58] Field of Search ...................... 427/195, 386, 393.5, 427/400; 264/54, 45.1; 156/77, 78, 79, 62.2, 307.1, 307.7

[56] References Cited

U.S. PATENT DOCUMENTS

| | | | |
|---|---|---|---|
| 3,655,470 | 4/1972 | Takeshima et al. | 156/79 |
| 3,692,602 | 9/1972 | Okada et al. | 156/79 |
| 3,925,528 | 12/1975 | Müller et al. | 264/54 |
| 4,278,728 | 7/1981 | Honda et al. | 156/79 |
| 5,091,487 | 2/1992 | Hori et al. | 526/87 |
| 5,162,380 | 11/1992 | Hori et al. | 521/90 |

FOREIGN PATENT DOCUMENTS

91/09076 11/1990 World Int. Prop. O. .

OTHER PUBLICATIONS

Abstract of JP 77044588, Nov. 1977.
Abstract of JP 71005221, Feb. 1971.
Abstract of JP 71005220, Feb. 1971.
Abstract of JP 58021433, May 1987.

*Primary Examiner*—Shrive Beck
*Assistant Examiner*—Erma Cameron
*Attorney, Agent, or Firm*—Millen, White, Zelano & Branigan

[57] ABSTRACT

A method of production of a plastic laminate having a protective layer on a foamed layer comprising coating plastisol containing a vinyl chloride resin or an acrylic resin having epoxy group and having average particle diameter of 0.05 to 5 mm and plasticizer as the essential components on the surface of vinyl chloride resin layer containing an organic foaming agent, then forming the combined layers by heating and foaming is provided. A plastic laminate having a protective layer of polyvinyl chloride having excellent surface strength, abrasion resistance and resistance to chemicals on a foamed layer can be produced efficiently.

17 Claims, No Drawings

METHOD OF PRODUCTION OF A PLASTIC LAMINATE

BACKGROUND OF THE INVENTION

1. Field of the Invention

The present invention relates to a novel method of production of a plastic laminate comprising a protective layer on the surface of a foamed layer of a polyvinyl chloride, More particularly, the present invention relates to a method of efficiently producing a plastic laminate comprising a crosslinked protective layer of a polyvinyl chloride or a polyacrylate having excellent strength, abrasion resistance and resistance to chemicals of the surface on a foamed layer of polyvinyl chloride.

2. Description of the Prior Art

Foamed materials of polyvinyl chloride have excellent ability for design and flame retarding property and have heretofore been used as raw materials for building materials, such as wall materials and floor materials. As the wall papers and floorings, laminates having protective layer for protecting the surface of the foamed materials are frequently used.

For the formation of the protective layer on the surface of the foamed materials, materials and methods of processing are suitably selected depending on the purpose. For example, when durability, such as resistance to chemicals, strength and abrasion resistance, is enhanced, a method in which a polyvinyl chloride pastisol containing a vinyl chloride resin of high degree of polymerization, such as a resin having average degree of polymerization of 1600 or more, or a polyvinyl chloride plastisol containing crosslinking agent, such as triazine, is coated on the surface of the foamed material and then heated to form a protective layer and a method in which a polyvinyl chloride film by calender processing containing a plasticizer in a smaller amount, such as 35 weight parts per 100 weight parts of the vinyl chloride resin, is laminated are adopted.

In another method, emulsion or film of other than polyvinyl chloride, such as polyacrylate and the like, is laminated or coated.

Recently, prevention of fouling of wall papers and floorings are strongly desired because of change of style of living. Organic solvents are frequently used in household generally for cleaning fouled materials. When an organic solvent which dissolves polyvinyl chlorides is used for this purpose, the protective layer is reduced to be ineffective. By this reason, the method in which a crosslinked protective layer is formed by using a plastisol containing a crosslinking agent, such as triazine compounds and the like, has been adopted as the preferable method.

However, this method has drawbacks that the polyvinyl chloride tends to be thermally degraded during processing and that formed articles have inferior weatherability, tending to cause loss of transparency and whitening with humidity.

On the other hand, the method of using raw materials other than polyvinyl chloride, such as emulsions and films of polyacrylate, has drawbacks that it cannot exhibit the properties sufficiently and that cost of the product is increased.

SUMMARY OF THE INVENTION

The present invention accordingly has an object to provide a method of production of a plastic laminate which comprises a foamed layer having a protective layer made of a crosslinked polyvinyl chloride or a crosslinked polyacrylate having sufficient durability, such as resistance to chemicals, strength and abrasion resistance, without using a crosslinking agent.

As the result of intensive study by the present inventors to achieve the object described above, it was particularly mentioned that a vinyl chloride resin or an acrylic resin containing epoxy group is crosslinked during the process of foaming by decomposition of an organic foaming agent and it was discovered that a layer of plastisol of polyvinyl chloride or polyacrylate containing epoxy group coated on the surface of the polyvinyl chloride layer containing an organic foaming agent is crosslinked by decomposition of the foaming agent in the foaming layer to form a protective layer having sufficient resistance to chemicals, strength and the like and a laminate having the excellent foamed layer can be easily obtained. The present invention was completed on the basis of the discovery.

Thus, the present invention provides a method of production of a plastic laminate which comprises coating a plastisol comprising a vinyl chloride resin or an acrylate resin containing epoxy group and having an average particle diameter in the range of 0.05 to 5 $\mu$m and a plasticizer on the surface of a substrate made by curing of a polyvinyl chloride composition containing an organic foaming agent at a temperature lower than the decomposition temperature of the organic foaming agent and then forming a foamed layer and a crosslinked protective layer on the surface of the foamed layer by heating to a temperature equal to or higher than the decomposition temperature of the organic foaming agent.

Other and further objects, features and advantages of the invention will appear more fully from the following description.

DETAILED DESCRIPTION OF THE INVENTION

The present invention is described in detail in the following.

The vinyl chloride resin or the acrylate resin containing epoxy group which is used in the protective layer of the present invention is particles of spherical shape. It is necessary that average diameter of the particles is in the range of 0.05 to 5 $\mu$m and preferably in the range of 0.5 to 5 $\mu$m.

When the average diameter is larger than this range, melting by heating becomes slower and the advantage of the present invention is not sufficiently exhibited. When the average diameter is smaller than this range, viscosity of the plastisol is too high and workability is inferior.

The vinyl chloride resin or the acrylic resin containing epoxy group described above which is used in the protective layer of the present invention preferably has concentration of epoxy group at the surface of the particle of $1 \times 10^{-2}$ weight % or more and total concentration of epoxy group of 10 weight % or less. Particularly preferably, it has the concentration of epoxy group at the surface of the particle in the range of $5 \times 10^{-2}$ to $5 \times 10^{-1}$ weight % and the total concentration of epoxy group in the range of 0.5 to 5 weight %.

When the concentration of epoxy group at the surface of the particle is less than $1 \times 10^{-2}$ weight %, the crosslinking property is inferior. When the total concentration of epoxy group is more than 10 weight %, viscosity of the plastisol is too high. Thus, conditions out of the specified range are not preferable. The concentration of epoxy group at the surface of the particle and the total concentration of epoxy group can be measured by the methods described later.

As the vinyl chloride resin containing epoxy group used in the present invention, (1) a copolymer comprising a repeating unit of vinyl chloride as the main component thereof, a repeating unit of a monomer containing an epoxy group and repeating units of monomers copolymerizable with these monomers which are introduced according to desire or (2) a polymer obtained by adding an epoxy group to a copolymer comprising a repeating unit of vinyl chloride as the main component thereof and repeating units of monomers copolymerizable with vinyl chloride which are used according to desire is used.

Examples of the monomer copolymerizable with vinyl chloride and the monomer containing epoxy group or copolymerizable with vinyl chloride which is used according to desire are: esters of unsaturated monocarboxylic acids, such as methyl ester, ethyl ester, propyl ester, butyl ester, octyl ester, cyclohexyl ester, benzyl ester and the like esters of methacrylic acid or acrylic acid; diesters of unsaturated dicarboxylic acids, such as dimethyl ester, diethyl ester, dipropyl ester, dibutyl ester, dioctyl ester, dicyclohexyl ester, dibenzyl ester and the like diesters of maleic acid or fumaric acid; vinyl ethers, such as methyl vinyl ether, ethyl vinyl ether, propyl vinyl ether and the like; vinyl esters of organic acids, such as vinyl acetate, vinyl propionate and the like; olefins, such as ethylene, propylene, butene-1, pentene-1 and the like; aromatic monovinyl compounds, such as styrene, α-methylstyrene and the like; cyanovinyl compounds, such as acrylonitrile, methacrylonitrile and the like; polymerizable unsaturated compounds having no reactive functional group, such as vinylidene chloride and the like; unsaturated monocarboxylic acids, unsaturated dicarboxylic acid and anhydrides of these acids, such as acrylic acid, methacrylic acid, ethacrylic acid, maleic acid, cinnamic acid, maleic anhydride, fumaric acid, itaconic acid, itaconic anhydride and the like; polymerizable unsaturated compounds containing carboxyl group, such as maleic acid monoalkyl esters, fumaric acid monoalkyl esters, itaconic acid monoalkyl esters, like other monoalkyl esters of unsaturated dicarboxylic acids and the like compounds; polymerizable unsaturated compounds containing amino group, such as 2-aminoethyl methacrylate, 2-aminoethyl acrylate, 2-aminopropyl methacrylate, 2-aminopropyl acrylate, 3-aminopropyl methacrylate, 3-aminopropyl acrylate, 2-aminobutyl methacrylate, 2-aminobutyl acrylate, 3-aminobutyl methacrylate, 3-aminobutyl acrylate, 4-aminobutyl methacrylate, 4-aminobutyl acrylate, methacrylamide, acrylamide, N-2-aminoethylmethacrylamide, N-2-aminoethylacrylamide, N-2-aminopropylmethacrylamide, N-2-aminopropylacrylamide, N-3-aminopropylmethacrylamide, N-3-aminopropylacrylamide and the like; and polymerizable unsaturated compounds containing hydroxyl group, such as 2-hydroxyethyl methacrylate, 2-hydroxyethyl acrylate, 2-hydroxypropyl methacrylate, 2-hydroxypropyl acrylate, 3-hydroxypropyl methacrylate, 3-hydroxypropyl acrylate, 2-hydroxybutyl methacrylate, 2-hydroxybutyl acrylate, 3-hydroxybutyl methacrylate, 3-hydroxybutyl acrylate, 4-hydroxybutyl methacrylate, 4-hydroxybutyl acrylate, dipentaerythritol hexamethacrylate, dipentaerythritol hexaacrylate and the like; and the like compounds. The unit of the copolymerizable monomer used according to desire may be introduced as a single kind or as a combination of two or more kinds. The unit of the monomer used according to desire is introduced to the vinyl chloride resin containing epoxy group preferably in the amount 10 weight % or less.

Examples of the monomer containing epoxy group used in the vinyl chloride resin containing epoxy group (1) are: glycidyl ethers, such as allyl glycidyl ether, methallyl glycidyl ether and the like; glycidyl esters of unsaturated acids, such as glycidyl methacrylate, glycidyl acrylate, glycidyl p-vinylbenzoate, methyl glycidyl itaconate, glycidyl ethyl maleate, glycidyl vinyl sulfonate, glycidyl (meth)allyl sulfonate and the like; and epoxyolefins, such as butadiene monooxide, vinylcyclohexene monooxide, 5,6-epoxyhexene, 2-methyl-5,6-epoxyhexene and the like. The monomer containing epoxy group may be used as a single kind or as a combination of two or more kinds.

As the method of preparation of the vinyl chloride resin containing epoxy group (1) described above, a method of copolymerizing the monomer described above by emulsion polymerization or microsuspension polymerization suited for production of vinyl chloride resins for paste processing can be adopted. A latex in which resin particles having average particle diameter of 0.05 to 5 μm are dispersed uniformly can be obtained by this method.

As the method of addition of epoxy group in the vinyl chloride resin containing epoxy group (2), a method in which vinyl chloride resin for paste processing is dehydrochlorinated by heat treatment or by contact with an alkali compound and then epoxidized by an organic peracid or the like can be adopted.

It is preferable that the vinyl chloride resin containing epoxy group used in the method of the present invention has average degree of polymerization in the range of 600 to 4000. When the average degree of polymerization is less than 600, mechanical strength is insufficient. When the average degree of polymerization is more than 4000, a large amount of heat is required for melting completely.

The acrylic resin containing epoxy group used in the method of the present invention can also be obtained by either the method of copolymerization or the method of addition of epoxy group to an acrylic polymer in the treatment after polymerization.

For obtaining the acrylic resin containing epoxy group by copolymerization, at least one kind of monomer selected from the group consisting of monomers containing epoxy group, at least one kind of monomer selected from the group consisting of methacrylate monomers or the group consisting of acrylate monomers and other monomers used according to necessity are copolymerized in a medium and then the copolymer is separated from the medium and dried. In an example of obtaining the acrylic resin containing epoxy group by graft copolymerization which is one of the forms of copolymerization, monomers containing a methacrylate or an acrylate as the main component thereof are polymerized at first and a monomer containing epoxy group is added and polymerized.

Examples of the method of obtaining the acrylic resin containing epoxy group by addition in the treatment after polymerization are a method in which an acrylic resin is epoxidized by the same treatment as that shown as an example of the method of obtaining the vinyl chloride resin containing epoxy group (2) described above and a method in which a monomer containing epoxy group is brought into contact with and added to a methacrylate polymer or an acrylate polymer.

Examples of the methacrylate monomer and the acrylate monomer are: alkyl methacrylates, such as methyl methacrylate, ethyl methacrylate, stearyl methacrylate and the like; alkyl acrylates, such as methyl acrylate, butyl acrylate and the like; alkylglycol methacrylates and alkylglycol acrylates, such as butoxyethyl methacrylate, butoxyethyl acrylate and the like; alkyleneglycol monomethacrylates and alkyleneglycol monoacrylate; and the like. Among these monomers, methyl methacrylate is preferable.

In the method of the present invention, plasticizer compounded with the vinyl chloride resin or the acrylic resin containing epoxy group described above is not particularly limited and plasticizers generally used as plasticizers of vinyl chloride resins heretofore can be used. Examples of the plasticizer are: phthalic acid derivatives, such as dimethyl phthalate, diethyl phthalate, dibutyl phthalate, di-(2-ethylhexyl) phthalate, di-n-octyl phthalate, diisobutyl phthalate, diheptyl phthalate, diphenyl phthalate, diisodecyl phthalate, ditridecyl phthalate, diundecyl phthalate, di-(heptyl, nonyl, undecyl) phthalate, benzyl phthalate, butyl benzyl phthalate, dinonyl phthalate, dicyclohexyl phthalate and the like; isophthalic acid derivatives, such as dimethyl isophthalate, di-(2-ethylhexyl) isophthalate, diisooctyl isophthalate and the like; tetrahydrophthalic acid derivatives, such as di-(2-ethylhexyl) tetrahydrophthalate, di-n-octyl tetrahydrophthalate, diisodecyl tetrahydrophthalate and the like; adipic acid derivatives, such as di-n-butyl adipate, di-(2-ethylhexyl) adipate, diisodecyl adipate, diisononyl adipate and the like; azelaic acid derivatives, such as di-(2-ethylhexyl) azelate, diisooctyl azelate, di-n-hexyl azelate and the like; sebacic acid derivatives, such as di-n-butyl sebacate, di-(2-ethylhexyl) sebacate and the like; maleic acid derivatives, such as di-n-butyl maleate, dimethyl maleate, diethyl maleate, di-(2-ethylhexyl) maleate and the like; fumaric acid derivatives, such as di-n-butyl fumarate, di-(2-ethylhexyl) fumarate and the like; trimellitic acid derivatives, such as tri-(ethylhexyl) trimellitate, tri-n-octyl trimellitate, triisodecyl trimellitate, triisooctyl trimellitate, tri-n-hexyl trimellitate, triisononyl trimellitate and the like; pyromellitic acid derivatives, such as tetra-(2-ethylhexyl) pyromellitate, tetra-n-octyl pyromellitate and the like; citric acid derivatives, such as triethyl citrate, tri-n-butyl citrate, acetyl triethyl citrate, acetyl tri-(2-ethylhexyl) citrate and the like; itaconic acid derivatives, such as monomethyl itaconate, monobutyl itaconate, dimethyl itaconate, diethyl itaconate, dibutyl itaconate, di-(2-ethylhexyl) itaconate and the like; oleic acid derivatives, such as butyl oleate, glyceryl monooleate, diethyleneglycol monooleate and the like; ricinolic acid derivatives, such as methyl acetyl ricinolate, butyl acetyl ricinolate, glyceryl monoricinolate, diethyleneglycol monoricinolate and the like; stearic acid derivatives, such as n-butyl stearate, glycerine monostearate, diethyleneglycol distearate and the like; other fatty acid derivatives, such as diethyleneglycol monolaurate, diethyleneglycol diperalgonate, pentaerythritol fatty acid ester and the like; phosphoric acid derivatives, such as triethyl phosphate, tributyl phosphate, tri-(2-ethylhexyl) phosphate, tributoxyethyl phosphate, triphenyl phosphate, cresyl diphenyl phosphate, tricresyl phosphate, trixylenyl phosphate, tris(chloroethyl) phosphate and the like; glycol derivatives, such as diethyleneglycol dibenzoate, dipropyleneglycol dibenzoate, triethyleneglycol dibenzoate, triethyleneglycol di-(2-ethylbutyrate), triethyleneglycol di-(2-ethylhexoate), dibutyl methylenebisthioglycolate and the like; glycerine derivatives, such as glycerol monoacetate, glycerol triacetate, glycerol tributyrate and the like; epoxy derivatives, such as epoxidized soy bean oil, epoxybutyl stearate, di-(2-ethylhexyl) epoxyhexahydrophthalate, diisodecyl epoxyhexahydrophthalate, epoxytriglyceride, epoxidized octyl oleate, epoxidized decyl oleate and the like; polyester plasticizers, such as polyesters of adipic acid, polyesters of sebacic acid, polyesters of phthalic acid and the like; liquid epoxy resins, such as water bisphenol A type liquid epoxy resins, novolac type liquid epoxy resins, polyglycol type liquid epoxy resins, alicyclic epoxy resins, aliphatic epoxy resins, tetrafunctional epoxy resins having tertiary amino nitrogen atom, epoxy resins modified with urethane, epoxy resins modified with nitrile rubbers and the like; adhesive plasticizers; polymerizable plasticizers, such as diallyl phthalate, oligomers of acrylic monomers and the like; and the like other plasticizers. These plasticizers may be used as a single kind or as a combination of two or more kinds.

The plasticizer is used in an amount generally in the range of 20 to 80 weight parts, preferably 40 to 80 weight parts, based on 100 weight parts of the vinyl chloride resin or the acrylic resin containing epoxy group described above. When the amount is higher than the specified range, physical properties are deteriorated and, when the amount is lower than the specified range, the product becomes too hard. Thus, conditions out of the specified range are not preferable.

In the plastisol of the present invention, other additives which are generally used in vinyl chloride plastisols, such as inorganic fillers, heat stabilizers, viscosity adjusting agents, diluents, coloring agents, flame retardants and the like, may be compounded according to desire.

Examples of the inorganic filler are: calcium carbonate, such as precipitating calcium carbonate, heavy calcium carbonate, ultrafine calcium carbonate and the like; magnesium carbonate; silicic acid salts, such as silica, tarc, diatomaceous earth, clay, mica and the like; aluminum hydroxide; alumina; and the like.

Examples of the heat stabilizer are: metal soaps, such as magnesium stearate, aluminum stearate, calcium stearate, barium stearate, zinc stearate, calcium laurate, barium laurate, zinc laurate and the like; metal salts, such as sodium salts, zinc salts and barium salts of phenol and naphthol and the like salts; organic tin compounds, such as dibutyltin dilaurate, dibutyltin dimaleate and the like; esters of phosphorous acid, such as diethyl phosphite, dibutyl phosphite, dioctyl phosphite, diphenyl isodecyl phosphite, tricresyl phosphite, triphenyl phosphite, tris(nonylphenyl) phosphite, triisooctyl phosphite and the like.

Examples of the viscosity adjusting agent and the diluent are solvents, such as xylene, solvent naphtha, mineral spirit, diisobutyl ketone, butyl acetate and the like, suitable surface active agents and the like. Examples of the flame retardant are antimony trioxide, red phosphorus, zinc borate, organic bromides, chlorinated paraffins and the like.

To the plastisol, conventional vinyl chloride resins for plastisol processing having no epoxy group may be compounded as well.

The foamed layer which forms the base of the protective layer of the invention essentially comprises an organic foaming agent and a vinyl chloride resin.

The organic foaming agent is not particularly limited and a suitable organic foaming agent can be selected from the foaming agents generally used for foaming of vinyl chloride resins and used in the present invention. Examples of such organic foaming agent are azodicarbonamide, benzenesulfonyl hydrazide, p-toluenesulfonyl hydrazide, p,p'-oxybis(benzenesulfonyl)hydrazide, dinitrosopentamethylenetetramine, N,N'-dinitroso-N,N'-dimethylterephthalamide, trihydrazinotriamine and the like. The organic foaming agent may used as a single kind or as a combination of two or more kinds. The amount compounded in the plastisol is selected generally in the range of 0.5 to 15 weight parts based on 100 weight parts of the vinyl chloride resin. When the amount is less than 0.5 weight parts, foaming is insufficient. When the amount is more than 15 weight parts, the foaming ratio is not increased as expected from the amount and the condition is economically unfavorable.

The vinyl chloride resin used for the foamed layer is homopolymer of vinyl chloride monomer, a copolymer containing vinyl chloride monomer unit as the main component thereof and monomer units copolymerizable with vinyl chloride or the like polymer.

Examples of the monomer copolymerizable with vinyl chloride are the same compounds as those described as examples of copolymerizable monomer constituting the vinyl chloride resin used for the protective layer described above.

As the vinyl chloride resin used in the foamed layer, a vinyl chloride resin for paste processing is preferable. To the foamed layer, other additives generally used for vinyl chloride plastisols, such as inorganic fillers, heat stabilizers, diluents, coloring agents, flame retardants and the like, may be compounded according to desire in addition to the plasticizer described above. More specific examples of the other additives are the same as those described above.

In the present invention, a layer of vinyl chloride resin containing the foaming agent as the essential component thereof is molded to form a foaming layer at a temperature which does not decompose the foaming agent and the plastisol comprising the vinyl chloride resin or the acrylic resin containing epoxy group as the main component thereof is coated on the base material thus formed. The combined layers are heated at a temperature preferably in the range of 150° to 300° C. for 30 seconds to 10 minutes to make foam in the foaming layer and the laminate having the crosslinked protective layer can be obtained. It is considered that the crosslinking reaction occurs through scission of the epoxy group by decomposition products of the foaming agent.

Thickness of the protective layer is preferably in the range of 2 to 3000 μm and more preferably in the range of 5 to 400 μm. When the thickness is less than 2 μm, desired resistance to chemicals and strength are not readily obtained. When the thickness is more than 3000 μm, a large amount of heat is required for melting completely.

Apparatuses and conditions generally used in the production of foamed materials by vinyl chloride plastisols can be adopted in the operations in the present invention, such as preparation of plastisol, coating of plastisol, gel formation by heating, foaming, pre-treatment, post-treatment and the like.

To summarize the advantages obtained by the invention, the foamed laminate having a protective layer of a crosslinked polyvinyl chloride or a crosslinked polyacrylate having excellent physical properties, such as surface strength, abrasion resistance and heat resistance, and resistance to chemicals can be produced without using a crosslinking agent according to the method of the present invention.

The invention will be understood more readily with reference to the following examples; however, these examples are intended to illustrate the invention and are not to be construed to limit the scope of the invention.

In Examples and Comparative Examples, "part" and "%" show weight part and weight %, respectively, unless otherwise mentioned.

Properties in Examples and Comparative Examples were obtained by the following methods.

(1) Concentration of epoxy group at the surface of a vinyl chloride resin containing epoxy group In a 300 ml wide top glass vessel with a glass stopper, 5 g of a vinyl chloride resin containing epoxy group, 1 ml of a 1N aqueous solution of hydrochloric acid and 100 ml of methanol were charged and mixed with a magnetic stirrer for 1 hour. The mixture was then treated with ultrasonic wave at 40° C. and titrated with a 1/10N alcohol solution of KOH (amount of the titration, a ml). Separately, the same operation was conducted without adding the vinyl chloride resin to obtain the blank value (amount of the blank titration, b ml). Concentration of epoxy group at the surface was obtained by the following equation:

concentration of epoxy group at the surface (weight %) = $43 \times [(b-a)f_1 \times 0.1]/w \times 10^{-1}$ wherein $f_1$: factor of the 1/10N KOH solution w: weight of the sample (g).

(2) Total concentration of epoxy group in a vinyl chloride resin containing epoxy group In a 300 ml wide top glass vessel with a glass stopper, a solution which had been prepared by dissolving 1 g of a vinyl chloride resin containing epoxy group in 100 ml of methyl ethyl ketone and 2 ml of a 1N aqueous solution of hydrochloric acid were charged and mixed with a magnetic stirrer for 1 hour. The mixture was then titrated with a 1/10N alcohol solution of KOH (amount of the titration, a ml). Separately, the same operation was conducted without adding the vinyl chloride resin to obtain the blank value (amount of the blank titration, b ml). Total concentration of epoxy group in the resin was obtained by the following equation:

total concentration of epoxy group (weight %) = $43 \times [(b-a)f_1 \times 0.1]/w \times 10^{-1}$ wherein $f_1$: factor of the 1/10N KOH solution w: weight of the sample (g).

(3) Foaming ratio of a foamed layer

Foaming ratio was obtained by the following equation:

foaming ratio = thickness of foamed layer after the foaming/thickness of the coated layer before the foaming (thickness of semi-cured sheet)

(4) Degree of volume swelling of a protective layer

A piece of a laminate of 20 mm square was dipped in tetrahydrofuran (THF) for 10 minutes and degree of volume swelling was obtained by the following equation:

$$\text{degree of volume swelling} = \left( \frac{\text{length of an edge after dipping}}{\text{length of an edge before dipping}} \right)^3.$$

A lower value of the degree of volume swelling is considered to show a higher degree of crosslinking.

(5) Resistance of a protective layer to chemicals

A piece of gauze impregnated with THF was pushed against surface of a protective layer and rubbed 10 times. Then, condition of the surface was evaluated by visual observation.

(6) Average degree of polymerization

Average degree of polymerization was obtained according to the viscosity method of Japanese Industrial Standard K6721.

(7) Average particle diameter

Average particle diameter was obtained by measuring and averaging lengths of 1000 particles in an electron microscopic photograph of ×10000 magnification by using a transmission type electron microscope.

(8) Fouling test for evaluation of surface abrasion

A laminate having a protective layer was attached to the whole part of the inner surface of a stainless steel vessel of 120 mmφ inner diameter and 100 mm depth. In the stainless steel vessel, 200 g of glass beads of 3 mmφ and 500 g of steel balls of 18 mmφ as abrasion accelerators and 7 g of carbon black as a fouling agent were charged. The vessel was placed on a roll mill and rotated at 80 rpm for 1 hour.

After 1 hour, the laminate attached to the inner surface of the vessel was taken out, washed with water and dried. Condition of fouling of the surface of the sample was visually observed and evaluated according to the following criterion: ○: scratch and fouling scarcely found on the surface; white foamed layer seen through the protective layer. ×: significant scratches and foulings found on the surface; white foamed layer not seen through the protective layer. Δ: some scratches and foulings found on the surface; white foamed layer seen through the protective layer.

Examples 1 to 4 and Comparative Examples 1 to 3

A plastisol was prepared according to the following compounding formulation by mixing with stirring for 10 minutes by using a planetary mixer (a product of Ishikawa Kojo Co., Ltd., No. 18 ®). The plastisol thus prepared was coated on a flame retarded paper to the thickness of 180 μm by using Mattice Oven ® (a product of Warner-Mattice Corp.) and hardened by heating at 150° C. for 45 seconds to form a foamed layer.

| | |
|---|---|
| vinyl chloride resin for paste processing | 100 weight parts |
| dioctyl phthalate | 60 weight parts |
| heavy calcium carbonate | 80 weight parts |
| titanium oxide (rutile form) | 15 weight parts |
| azodicarbonamide | 5 weight parts |
| Na—Zn liquid stabilizer | 3 weight parts |
| mineral spirit | 10 weight parts |

For preparation of a protective layer, compounding ingredients shown in Tables 1 and 2 were mixed in the planetary mixer described above and then defoamed for 10 minutes by using a vacuum stirred defoaming machine to prepare a plastisol. Then, this plastisol was coated on the foamed layer prepared above to the thickness of 100 μm by using Mattice Oven ® and hardened by heating at 150° C. for 45 seconds. Samples of 5×5 cm square each were cut out from the laminate thus prepared and heated in four conditions of 30, 45, 60 and 75 seconds in Mattice Oven ® at 200° C. to prepare foamed materials.

The results are shown in Tables 1 and 2.

TABLE 1

| Example | | 1 | 2 | 3 | — | — |
|---|---|---|---|---|---|---|
| Comparative Example | | — | — | — | 1 | 2 |
| Composition of plastisol for surface protective layer (weight part) | | | | | | |
| PVC1 | | 100 | — | — | — | — |
| PVC2 | | — | 100 | 50 | — | — |
| PVC3 | | — | — | 50 | 100 | — |
| PVC4 | | — | — | — | — | 100 |
| dioctyl phthalate | | 50 | 50 | 50 | 50 | 50 |
| Ba—Zn heat stabilizer | | 3 | 3 | 3 | 3 | 3 |
| Properties | | | | | | |
| foaming ratio of foamed layer, | 30 | 2.3 | 2.7 | 2.6 | 2.4 | 2.3 |
| heating at 200° C. | 40 | 3.8 | 4.6 | 4.3 | 3.8 | 4.0 |
| (second) | 60 | 5.2 | 6.6 | 6.1 | 5.5 | 5.4 |
| | 75 | 8.8 | 9.7 | 9.0 | 9.1 | 9.1 |
| degree of volume swelling (in THF, 10 min.) | 30 | ∞ | ∞ | ∞ | ∞ | ∞ |
| heating time of sample | 40 | 8.0 | 7.9 | 7.9 | ∞ | ∞ |
| (second) | 60 | 7.9 | 8.1 | 8.0 | ∞ | ∞ |
| | 75 | 8.1 | 8.0 | 8.0 | ∞ | ∞ |
| resistance to chemicals; heating time of sample: 60 seconds | | no change | no change | no change | surf.lyr. dislvd. | surf.lyr. dislvd. |
| fouling at the surface; heating | | ○ | ○ | Δ | × | Δ |

TABLE 1-continued

| Example | 1 | 2 | 3 | — | — |
|---|---|---|---|---|---|
| Comparative Example | — | — | — | 1 | 2 |
| time of sample: 75 seconds | | | | | |

Notes for Table 1:
PVC1: a vinyl chloride resin for paste processing containing epoxy group; average particle diameter, 0.9 μm; average degree of polymerization, 700; concentration of epoxy group at the surface, 0.09 weight %; total concentration of epoxy group, 0.92 weight %.
PVC2: a vinyl chloride resin for paste processing containing epoxy group; average particle diameter, 1.0 μm; average degree of polymerization, 1250; concentration of epoxy group at the surface, 0.10 weight %; total concentration of epoxy group, 1.03 weight %.
PVC3: a vinyl chloride homopolymer resin for paste processing; average particle diameter, 1.2 μm; average degree of polymerization, 850.
PVC4: a vinyl chloride homopolymer resin for paste processing; average particle diameter, 1.2 μm; average degree of polymerization, 3500.
∞: dissolved.
surf.lyr.dislvd.: surface layer dissolved.
no change: no change at the surface.

TABLE 2

| Example | | 4 | — |
|---|---|---|---|
| Comparative Example | | — | 3 |
| Composition of plastisol for surface, protective layer (weight part) | | | |
| PMMA1 | | 100 | — |
| PMMA2 | | — | 100 |
| dibutyl phthalate | | 80 | 80 |
| Properties | | | |
| foaming ratio of foamed layer, heating at 200° C. | 30 | 2.4 | 2.4 |
| heating time of sample (second) | 40 | 3.8 | 3.7 |
| | 60 | 5.4 | 5.5 |
| | 75 | 8.9 | 8.7 |
| degree of volume swelling (in THF, 10 min.) | 30 | ∞ (dissolved) | ∞ (dissolved) |
| heating time of sample (second) | 40 | 5.0 | ∞ (dissolved) |
| | 60 | 4.9 | ∞ (dissolved) |
| | 75 | 4.9 | ∞ (dissolved) |
| resistance to chemicals; heating time of sample: 60 seconds | | no change at the surface | surface layer dissolved |

Notes for Table 2:
PMMA1: a methyl methacrylate resin for paste processing containing epoxy group; average particle diameter, 1.0 μm; average degree of polymerization, 30000; concentration of epoxy group at the surface, 0.11 weight %; total concentration of epoxy group, 2.0 weight %.
PMMA2: a methyl methacrylate homopolymer for paste processing.

While the invention has been particularly shown and described with reference to preferred embodiments thereof, it will be understood by those skilled in the art that the foregoing and other changes in form and details can be made therein without departing from the spirit and scope of the invention.

What is claimed is:

1. A method of production of a plastic laminate which comprises the steps of forming a foamable but unfoamed substrate by molding a vinyl chloride resin composition containing an organic foaming agent at a temperature lower than the decomposition temperature of the organic foaming agent; coating the surface of the thus-formed substrate with a plastisol comprising an epoxy group-containing polyvinyl chloride resin or an epoxy group-containing acrylic resin, said resin having an average particle diameter in the range of 0.05 to 5 μm; and then converting the thus-coated substrate into a foamed layer having a crosslinked protective layer on the surface thereof by heating the thus-coated unfoamed substrate to a temperature equal to or higher than the decomposition temperature of the organic foaming agent.

2. A method of production of a plastic laminate as claimed in claim 1, wherein the organic foaming agent is one or more agents selected from the group consisting of azodicarbonamide, benzenesulfonylhydrazide, p-toluenesulfonylhydrazide, p,p'-oxybis(benzenesulfonylhydrazide), dinitrosopentamethylenetetramine, N,N'-dinitroso-N,N'-dimethylterephthalamide and trihydrazinotriamine.

3. A method of production of a plastic laminate which comprises the steps of molding of a vinyl chloride resin plastisol composition containing an organic foaming agent at a temperature lower than the decomposition temperature of the organic foaming agent to form an unfoamed substrate; coating the surface of the thus-formed substrate with a plastisol comprising an epoxy group-containing acrylic resin having an average particle diameter in the range of 0.05 to 5 μm; and then converting the thus-coated substrate into a foamed layer having a crosslinked protective layer on the surface thereof by heating the thus-coated unfoamed substrate to a temperature equal to or higher than the decomposition temperature of the organic foaming agent.

4. A method of production of a plastic laminate as claimed in claim 1, wherein the polyvinyl chloride resin or the acrylic resin has a concentration of the epoxy group at the surface of the particle of $1 \times 10^{-2}$ weight % or more and concentration of the total epoxy group of 10 weight % or lower.

5. A method of production of a plastic laminate as claimed in claim 1, wherein the polyvinyl chloride resin or the acrylic resin has a concentration of the epoxy group at the surface of the particle in the range of $5 \times 10^{-2}$ to $5 \times 10^{-1}$ weight % and concentration of the total epoxy group in the range of 0.5 to 5 weight %.

6. A method of production of a plastic laminate as claimed in claim 1, wherein the polyvinyl chloride resin or the acrylic resin is obtained by copolymerizing 50 weight % or more of vinyl chloride monomer, a methacrylate monomer or an acrylate monomer with a monomer having an epoxy group and monomers copolymerizable therewith.

7. A method of production of a plastic laminate as claimed in claim 1, wherein the polyvinyl chloride resin or the acrylic resin is prepared by adding an epoxy group to a polymer obtained by copolymerizing 50 weight % or more of a vinyl chloride monomer, a methacrylate monomer or an acrylate monomer with monomers copolymerizable therewith.

8. A method of production of a plastic laminate as claimed in claim 1, wherein the plastisol comprises an acrylic resin comprising 50 weight % or more of at least one kind selected from the group consisting of alkyl methacrylates, alkyl acrylates, alkylglycol methacrylates, alkylglycol acrylates, alkyleneglycol monomethacrylates and alkyleneglycol monoacrylates.

9. A method of production of a plastic laminate as claimed in claim 1, wherein the plastisol comprises 20 to 80 weight parts of the plasticizer based on 100 weight parts of the vinyl chloride resin or the acrylic resin.

10. A method of production of a plastic laminate as claimed in claim 1, wherein the crosslinked protective layer has thickness of 2 to 3000 μm.

11. A method of production of a plastic laminate as claimed in claim 1, wherein the vinyl chloride resin composition containing an organic foaming agent contains 0.5 to 15 weight parts of an organic foaming agent based on 100 weight parts of the vinyl chloride resin.

12. A method of production of a plastic laminate as claimed in claim 2, wherein the plastisol comprises an acrylic resin comprising 50 weight % or more of at least one resin selected from the group consisting of alkyl methacrylates, alkyl acrylates, alkylglycol methacrylates, alkylglycol acrylates, alkyleneglycol monomethacrylates and alkyleneglycol monoacrylates.

13. A method of production of a plastic laminate as claimed in claim 3, wherein the plastisol comprises an acrylic resin comprising 50 weight % or more of at least one resin selected from the group consisting of alkyl methacrylates, alkyl acrylates, alkylglycol methacrylates, alkylglycol acrylates, alkyleneglycol monomethacrylates and alkyleneglycol monoacrylates.

14. A method of production of a plastic laminate as claimed in claim 4, wherein the plastisol comprises an acrylic resin comprising 50 weight % or more of at least one resin selected from the group consisting of alkyl methacrylates, alkyl acrylates, alkylglycol methacrylates, alkyl lycol acrylates, alkyleneglycol monomethacrylates and alkyleneglycol monoacrylates.

15. A method of production of a plastic laminate as claimed in claim 5, wherein the plastisol comprises an acrylic resin comprising 50 weight % or more of at least one resin selected from the group consisting of alkyl methacrylates, alkyl acrylates, alkylglycol methacrylates, alkylglycol acrylates, alkyleneglycol monomethacrylates and alkyleneglycol monoacrylates.

16. A method of production of a plastic laminate as claimed in claim 6, wherein the plastisol comprises an acrylic resin comprising 50 weight % of more of at least one resin selected from the group consisting of alkyl methacrylates, alkyl acrylates, alkyl glycol methacrylates, alkyl glycol acrylates, alkyleneglycol monomethacrylates and alkyleneglycol monoacrylates.

17. A method of production of a plastic laminate as claimed in claim 7, wherein the plastisol comprises an acrylic resin comprising 50 weight % of more of at least one resin selected from the group consisting of alkyl methacrylates, alkyl acrylates, alkylglycol methacrylates, alkylglycol acrylates, alkyleneglycol monomethacrylates and alkyleneglycol monoacrylates.

* * * * *

UNITED STATES PATENT AND TRADEMARK OFFICE
CERTIFICATE OF CORRECTION

PATENT NO. : 5,350,550
DATED : September 27, 1994
INVENTOR(S) : Kouitu KITAZAWA et al.

It is certified that error appears in the above-indentified patent and that said Letters Patent is hereby corrected as shown below:

Claim 14, column 14, line 4:   Change "alkyl lycol" to read --alkylglycol--.

Claim 16, column 14, line 15:  Delete "of" and insert --or--.

Claim 17, column 14, line 23:  Delete "of" and insert --or--.

Signed and Sealed this

Sixth Day of December, 1994

Attest:

BRUCE LEHMAN

*Attesting Officer*     *Commissioner of Patents and Trademarks*